Oct. 3, 1933.  W. J. MILLER  1,929,283
FILM HOLDER
Filed April 8, 1932
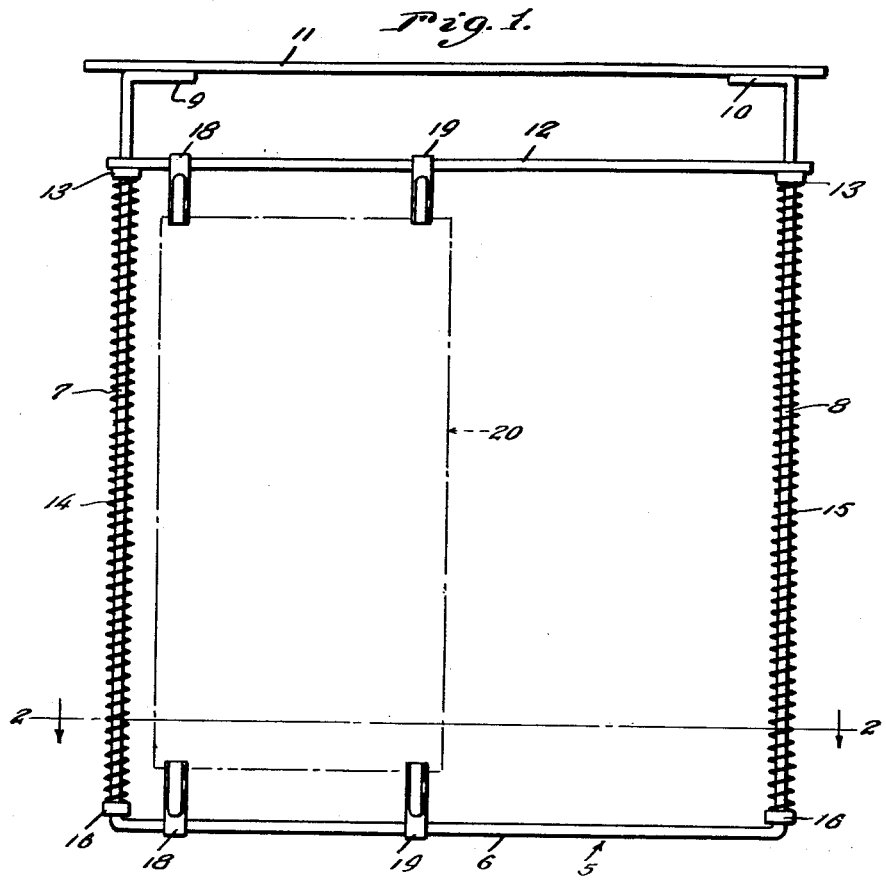
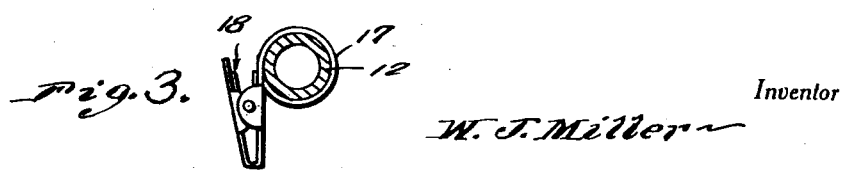
Inventor
W. J. Miller
By Clarence A. O'Brien
Attorney Patented Oct. 3, 1933

1,929,283

UNITED STATES PATENT OFFICE

1,929,283

FILM HOLDER

William J. Miller, Chicago, Ill.

Application April 8, 1932. Serial No. 604,056

8 Claims. (Cl. 95—100)

My invention relates to holders for films and the like.

It is an object of my invention to provide a device for holding films or the like sheet objects in an unwrinkled and full extended condition, wherein the films or the like are maintained in the fully stretched, unwrinkled condition by automatic operation of the device, which is also adjustable so as to accommodate easily films or the like of different sizes.

Other objects and advantages of my invention will be apparent from a reading of the following description taken in connection with the drawings, wherein for purposes of illustration I have shown a preferred embodiment of the invention.

In the drawing:—

Figure 1 is a general elevational view of the device of my invention showing it in use.

Figure 2 is a horizontal sectional view taken approximately on the line 2—2 of Figure 1 looking downwardly in the direction of the arrows.

Figure 3 is a transverse sectional view showing the attachment of one of the clips to one of the transverse members of the device.

Referring in detail to the drawing, wherein like numerals refer to like parts throughout the same, the numeral 5 generally designates a generally U-shaped frame which may be composed of a single length of bar or wire or tubing of suitable gauge, whereby to provide a bottom member 6 and vertical side members 7, 8, respectively, as well as inturned end portions 9 and 10, to which is suitably connected a top transverse member 11 which has ends extended outwardly of the side members 7, 8. This extension of the ends of the top transverse member 11 provide suitable arrangement for connecting supporting or suspending means as desired.

A slidable transverse member 12 is provided at either end with an opening to slidably receive one of the side members 7, 8, and the member 12 disposed transversely between the side members 7, 8 and slidably mounted thereon. A slidable bushing 13 is provided for arrangement in connection with the ends of the transverse movable members whereby to facilitate the guiding of the transverse movable member 12 and to properly relate thereto each of the springs 14, 15 which are circumposed on the side members 7, 8, respectively, so that they act between the bushings 13 and other bushings 16 at the lower end of the side members 7, and 8 which are stationary, whereby the transverse movable member 12 is normally maintained in an up position.

Mounted by means of portions 17 circumposed about one of the transverse members spring clips generally designated 18 and 19 are utilized for securing the edges of the film or the like generally designated 19' in the manner illustrated in Figure 1.

One of the spring clips 18 is stationarily mounted upon the upper movable transverse member 12, while another of the spring clips 18 is mounted in a stationary manner upon the lower transverse member 6, and in inwardly directed position so as to receive the edges of the film or the like 20. The spring clips 19 are slidably mounted on the upper transverse movable member 12 and the lower transverse member 6 so that they may be moved along the transverse members to positions corresponding with the width of the film or the like so as to be positioned for properly holding the film at the side edges thereof.

It will be observed that the functioning of the springs 14, 15, once the spring clips 18, 19 have been properly attached to the film, will act, to properly stretch the film or the like 20 for such purposes as printing and copying X-ray films and for developing such X-ray films, and when so utilized the device of my invention may be regarded as included within the class of devices which is referred to as a film hanger.

Though I have shown and described herein a preferred embodiment of the invention, it is to be definitely understood that I do not desire to limit the application of the invention thereto, but any change or changes may be made in materials, and in structure and arrangement of parts, within the spirit of the invention and the scope of the subjoined claims.

What is claimed is:—

1. A supporting device comprising a frame, a movable member on the frame, means for holding an object between the frame and the movable member, said means being slidable transversely of the frame.

2. A supporting device comprising a frame, a movable member on the frame, means for holding an object between the frame and the movable member, said means being slidable transversely of the frame, and means for automatically moving the movable member relative to the frame so as to hold the object in a stretched condition.

3. A supporting device comprising a frame, a movable member on the frame, means for holding an object between the frame and the movable member, said means being slidable transversely of the frame, and means for automatically moving the movable member relative to the frame so as to hold the object in a stretched condition, said holding means being adjustable with respect to the movable member and respect to the frame.

4. A device of the character described comprising a frame, movable means slidably supported on opposed portions of the frame, article securing means on the frame and on the movable means in opposed relation for holding an article therebetween, said article securing means on the frame and on the movable means being adjustable for securing articles of different sizes.

5. A device of the character described comprising a pair of parallel side members, a pair of end members connecting the side members, a cross member mounted between and slidably on the side members, means yieldably urging the cross member toward one of the end members, article securing means on the remaining end member, and other article securing means on the slidable cross member.

6. A device of the character described comprising a pair of parallel side members, a pair of end members connecting the side members, a cross member mounted between and slidably on the side members, means yieldably urging the cross member toward one of the end members, article securing means on the remaining end member, and other article securing means on the slidable cross member, some of said article securing means being slidable on the remaining end member and on the cross member.

7. A device of the character described comprising a pair of parallel side members, a pair of end members connecting the side members, a cross member mounted between and slidably on the side members, means yieldably urging the cross member toward one of the end members, article securing means on the remaining end member, and other article securing means on the slidable cross member, said article securing means being spaced from the side members.

8. A device of the character described comprising a pair of parallel side members, a pair of end members connecting the side members, a cross member mounted between and slidably on the side members, means yieldably urging the cross member toward one of the end members, article securing means on the remaining end member, and other article securing means on the slidable cross member, some of said article securing means being slidable on the remaining end member and on the cross member, said article securing means being spaced from the side members.

WILLIAM J. MILLER.